United States Patent
Venkatraman et al.

(10) Patent No.: US 9,247,518 B2
(45) Date of Patent: Jan. 26, 2016

(54) MOBILE DEVICE POSITIONING RESPONSIVE TO EXTERNALLY GENERATED REGIONAL CANDIDATE POSITION FIX MODE SELECTION

(71) Applicant: QUALCOMM Incorporated, San Diego, CA (US)

(72) Inventors: Sai Pradeep Venkatraman, Santa Clara, CA (US); Weihua Gao, San Jose, CA (US); Benjamin A. Werner, San Carlos, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 13/797,471

(22) Filed: Mar. 12, 2013

(65) Prior Publication Data

US 2014/0274108 A1    Sep. 18, 2014

(51) Int. Cl.
*H04W 24/00* (2009.01)
*H04W 64/00* (2009.01)
*G01S 19/46* (2010.01)
*G01S 19/48* (2010.01)
*G01S 5/02* (2010.01)

(52) U.S. Cl.
CPC ............. *H04W 64/00* (2013.01); *G01S 5/0263* (2013.01); *G01S 19/46* (2013.01); *G01S 19/48* (2013.01)

(58) Field of Classification Search
CPC .................................................... H04W 64/00
USPC ...................................................... 455/465.1
See application file for complete search history.

(56) References Cited

U.S. PATENT DOCUMENTS

| | | | |
|---|---|---|---|
| 6,249,252 B1 | 6/2001 | Dupray |
| 6,252,543 B1 | 6/2001 | Camp |
| 6,694,150 B1 | 2/2004 | Standke et al. |
| 6,785,609 B2 | 8/2004 | Suda |
| 7,127,257 B2 | 10/2006 | Riley et al. |
| 7,647,055 B2 | 1/2010 | Gum et al. |
| 7,663,540 B2 | 2/2010 | Oda et al. |

(Continued)

FOREIGN PATENT DOCUMENTS

| | | |
|---|---|---|
| EP | 2046087 A1 | 4/2009 |
| EP | 2270535 A2 | 1/2011 |

(Continued)

OTHER PUBLICATIONS

International Search Report and Written Opinion—PCT/US2014/022218—ISA/EPO—Nov. 26, 2014.

*Primary Examiner* — Timothy Pham
(74) *Attorney, Agent, or Firm* — Berkeley Law & Technology Group, LLP

(57) ABSTRACT

Various methods, apparatuses and/or articles of manufacture are provided which may be implemented for use by a mobile device to affect at least one positioning function based, at least in part, on a recommended candidate position fix mode received from another electronic device for use in a particular region of an environment. For example, a mobile device may obtain assistance data indicative of a candidate position fix mode for a partial region of an environment navigable by the mobile device, and in response to a determination that the mobile device is estimated to be located within a threshold proximity of the partial region, affect a wireless signal-based positioning function based, at least in part, on the candidate position fix mode.

80 Claims, 3 Drawing Sheets

(56) References Cited

U.S. PATENT DOCUMENTS

| | | |
|---|---|---|
| 7,916,072 B2 | 3/2011 | Corazza et al. |
| 7,970,414 B1 | 6/2011 | Werden et al. |
| 8,041,370 B2 | 10/2011 | Pomerantz et al. |
| 8,213,957 B2 | 7/2012 | Bull et al. |
| 2001/0048387 A1 | 12/2001 | Sheynblat |
| 2002/0082024 A1 | 6/2002 | Bajikar |
| 2002/0154060 A1 | 10/2002 | Smith |
| 2002/0176579 A1 | 11/2002 | Deshpande et al. |
| 2002/0184418 A1 | 12/2002 | Blight |
| 2003/0046158 A1 | 3/2003 | Kratky |
| 2003/0050089 A1 | 3/2003 | Ogino et al. |
| 2003/0078054 A1 | 4/2003 | Okuda |
| 2003/0118015 A1 | 6/2003 | Gunnarsson et al. |
| 2003/0134646 A1 | 7/2003 | Forrester |
| 2003/0134657 A1 | 7/2003 | Norta et al. |
| 2003/0222819 A1 | 12/2003 | Karr et al. |
| 2004/0030601 A1 | 2/2004 | Pond et al. |
| 2004/0043758 A1 | 3/2004 | Sorvari et al. |
| 2004/0120323 A1 | 6/2004 | Viikari et al. |
| 2004/0176958 A1 | 9/2004 | Salmenkaita et al. |
| 2004/0189515 A1 | 9/2004 | Vannucci |
| 2004/0253984 A1 | 12/2004 | Csapo et al. |
| 2005/0039136 A1 | 2/2005 | Othmer |
| 2005/0060118 A1 | 3/2005 | Pavel et al. |
| 2005/0063409 A1 | 3/2005 | Oommen |
| 2005/0159169 A1* | 7/2005 | Humphries et al. ....... 455/456.1 |
| 2007/0049295 A1 | 3/2007 | Soliman et al. |
| 2007/0109184 A1 | 5/2007 | Shyr et al. |
| 2007/0142063 A1* | 6/2007 | Chiu et al. ................ 455/456.3 |
| 2007/0279281 A1* | 12/2007 | Oda et al. ................. 342/357.06 |
| 2009/0181695 A1* | 7/2009 | Wirola et al. ............. 455/456.1 |
| 2009/0196267 A1 | 8/2009 | Walker, Sr. |
| 2009/0228209 A1 | 9/2009 | Alanen et al. |
| 2009/0303118 A1* | 12/2009 | Corazza et al. .......... 342/357.09 |
| 2010/0039929 A1* | 2/2010 | Cho et al. ....................... 370/216 |
| 2010/0317366 A1 | 12/2010 | Shen et al. |
| 2012/0021762 A1* | 1/2012 | Garin et al. ................ 455/456.1 |
| 2012/0028649 A1* | 2/2012 | Gupta et al. ............... 455/456.1 |
| 2012/0116677 A1 | 5/2012 | Higgison et al. |
| 2012/0119948 A1* | 5/2012 | Tsuda ....................... 342/357.29 |
| 2012/0176410 A1* | 7/2012 | Meier et al. .................... 345/633 |
| 2013/0035111 A1 | 2/2013 | Moeglein et al. |
| 2014/0274130 A1 | 9/2014 | Venkatraman et al. |

FOREIGN PATENT DOCUMENTS

| | | |
|---|---|---|
| JP | 1089980 A2 | 4/1989 |
| JP | 11218571 | 8/1999 |
| JP | 2000132797 | 5/2000 |
| JP | 2002318272 | 10/2002 |
| JP | 2003087847 | 3/2003 |
| JP | 2003194912 | 7/2003 |
| KR | 20030040200 | 5/2003 |
| RU | 2201034 C2 | 3/2003 |
| RU | 30440 U1 | 6/2003 |
| RU | 31666 U1 | 8/2003 |
| RU | 32309 U1 | 9/2003 |
| WO | 9615636 A1 | 5/1996 |
| WO | 9906851 A1 | 2/1999 |
| WO | 9961934 A1 | 12/1999 |
| WO | 0131966 A1 | 5/2001 |
| WO | 0150151 A1 | 7/2001 |
| WO | WO-2007025151 A2 | 3/2007 |

* cited by examiner

MOBILE DEVICE POSITIONING RESPONSIVE TO EXTERNALLY GENERATED REGIONAL CANDIDATE POSITION FIX MODE SELECTION

BACKGROUND

1. Field

The subject matter disclosed herein relates to electronic devices, and more particularly to methods, apparatuses and articles of manufacture for use by a mobile device to affect at least one positioning function based, at least in part, on a recommended candidate position fix mode received from another electronic device for use in a particular region of an environment.

2. Information

The global positioning system (GPS) and other like satellite positioning systems (SPSs) have enabled positioning and navigation services for mobile devices in outdoor environments. Since satellite signals may not be reliably received and hence acquired in an indoor environment, different wireless signal-based positioning techniques may be employed to enable navigation services. For example, mobile devices may seek to obtain a position fix by estimating ranges to one or more terrestrial-based wireless network access point devices, which are positioned at known locations, based on one or more wireless signals acquired from and/or exchanged with the transmitting devices. Such ranges may be measured, for example, by obtaining a MAC ID address or other like information that may be used to identify a location of the transmitting device from wireless signals acquired from such transmitting devices, and measuring one or more characteristics of the wireless signals, such as, for example, a received signal strength (RSSI), a round trip time (RTT), just to name a few examples, which may used to estimate a distance to a transmitting device.

In certain instances, a positioning function within a mobile device may process certain measurements obtained while the mobile device is in one particular environment differently than for other measurements obtained while the mobile device was in a different environment. As such, it may be useful for a mobile device to know the type of environment it may be located in, e.g., indoor versus outdoor. Furthermore, as may be appreciated, there may be different types of indoor environments, such as, e.g., shielded versus unshielded, multi-level versus single-level, etc., which may correspond to different signaling, measurements, processes, etc. Likewise, there may be different types of outdoor environments, such as, e.g., outdoor environments served by a global SPS (GNSS), outdoor environments that may be served by a global SPS and also a regional SPS (e.g., China's Beidou regional system, the Indian Regional Navigational Satellite System (IRNSS), etc.).

However, as may be appreciated, it may be difficult at times for a mobile device to determine how or when to attempt to perform certain signal-based positioning techniques.

SUMMARY

In accordance with certain aspects, a method may be provided for use with a mobile device which comprises: obtaining assistance data from at least one other electronic device, the assistance data being indicative of a candidate position fix mode for a partial region of an environment navigable by the mobile device, the candidate position fix mode being selected from a plurality of wireless signal-based positioning modes comprising at least: a first wireless signal-based positioning mode based on first wireless signals transmitted by a terrestrial-based transmitting device, a second wireless signal-based positioning mode based on a second wireless signals transmitted a satellite-based transmitting device, and a third wireless signal-based positioning mode based on a combination of the first wireless signals and the second wireless signals. Such a method further comprises affecting a wireless signal-based positioning function based, at least in part, on the candidate position fix mode, in response to a determination that the mobile device is estimated to be located within a threshold proximity of the partial region.

In accordance with certain other aspects, a mobile device may be provided which comprises a communications transceiver and a processing unit. Here, for example, a processing unit may: obtain, via the communications transceiver, assistance data indicative of a candidate position fix mode for a partial region of an environment navigable by the mobile device, the candidate position fix mode being selected from a plurality of wireless signal-based positioning modes comprising at least: a first wireless signal-based positioning mode based on first wireless signals transmitted by a terrestrial-based transmitting device, a second wireless signal-based positioning mode based on a second wireless signals transmitted a satellite-based transmitting device, and a third wireless signal-based positioning mode based on a combination of the first wireless signals and the second wireless signals; and in response to a determination that the mobile device is estimated to be located within a threshold proximity of the partial region, affect a positioning function based, at least in part, on the candidate position fix mode.

In accordance with yet another aspect apparatus may be provided for use in a mobile device. Here, for example, the apparatus may comprise: means for accessing assistance data indicative of a candidate position fix mode for a partial region of an environment navigable by the mobile device, the candidate position fix mode being selected from a plurality of wireless signal-based positioning modes comprising at least: a first wireless signal-based positioning mode based on first wireless signals transmitted by a terrestrial-based transmitting device, a second wireless signal-based positioning mode based on a second wireless signals transmitted a satellite-based transmitting device, and a third wireless signal-based positioning mode based on a combination of the first wireless signals and the second wireless signals; and means for affecting a wireless signal-based positioning function based, at least in part, on the candidate position fix mode, in response to a determination that the mobile device is estimated to be located within a threshold proximity of the partial region.

In accordance with still other aspects, an article of manufacture may be provided which comprises a non-transitory computer readable medium having computer implementable instructions that are executable by a processing unit of a mobile device to: obtain assistance data indicative of a candidate position fix mode for a partial region of an environment navigable by the mobile device, the candidate position fix mode being selected from a plurality of wireless signal-based positioning modes comprising at least: a first wireless signal-based positioning mode based on first wireless signals transmitted by a terrestrial-based transmitting device, a second wireless signal-based positioning mode based on a second wireless signals transmitted a satellite-based transmitting device, and a third wireless signal-based positioning mode based on a combination of the first wireless signals and the second wireless signals; and in response to a determination that the mobile device is estimated to be located within a threshold proximity of the partial region, affect a wireless signal-based positioning function based, at least in part, on the candidate position fix mode.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
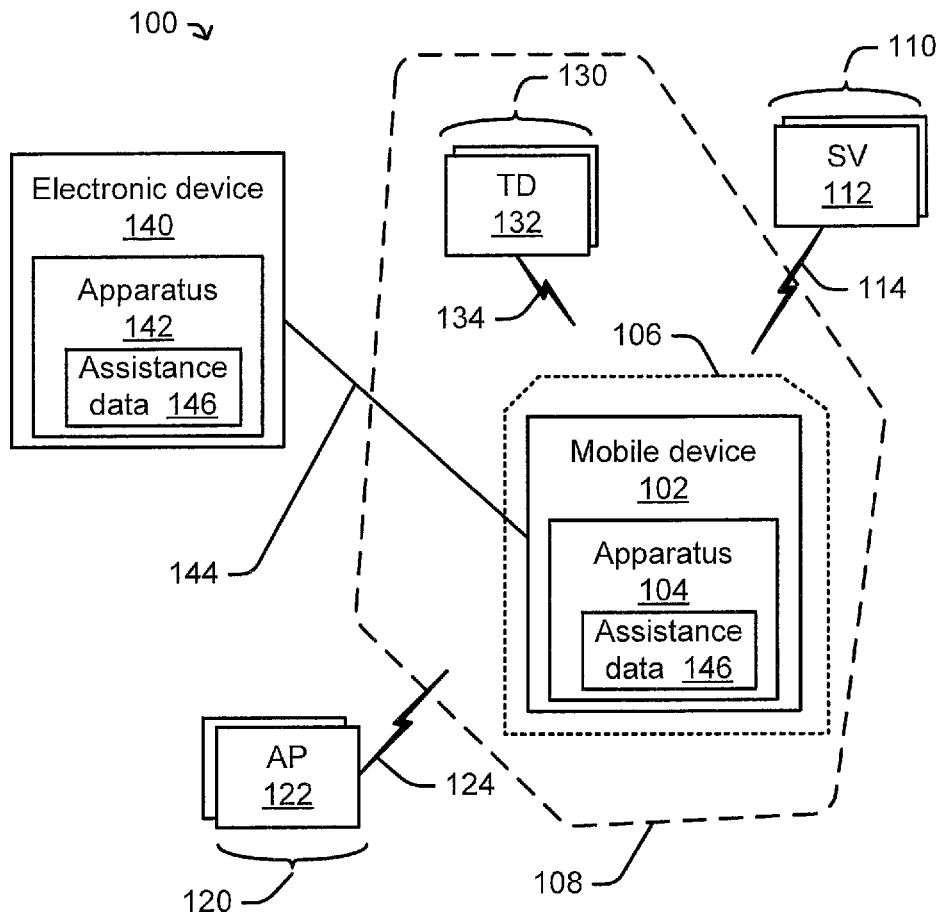
FIG. 1 is a schematic block diagram illustrating an arrangement of representative electronic devices including a mobile device to receive and/or otherwise access, and make use of, a recommended candidate position fix mode corresponding to a particular region of an environment, in accordance with an example implementation.

As mentioned, a mobile device may attempt to acquire wireless signals for use in performing one or more positioning functions. For example, in certain environments, such as some outdoor environments, wireless signals from an applicable number of satellite-based transmitting devices may be acquired and processed to estimate a position fix for the mobile device. Unfortunately, in certain environments, such as some indoor environments, a mobile device may be unable to acquire enough or possibly even any wireless signals from such satellite-based transmitting devices, e.g., due to interference, attenuation, etc. Nonetheless, in certain locations, e.g., within an indoor environment, a mobile device may be able to acquire wireless signals from an applicable number of terrestrial-based transmitting devices to estimate its position fix. Since the techniques used by the mobile device to acquire and/or process such wireless signals may vary, it may be useful for a mobile device to know in advance which technique to try first.

Furthermore, as may be appreciated, wireless signal propagation and acquisition may not always adhere to traditional indoor and outdoor boundaries. Thus, for example, in certain situations one or more wireless signals transmitted by one or more satellite-based transmitting devices may be acquired by a mobile device while located in an indoor environment. Similarly, for example, in certain situations one or more wireless signals transmitted by one or more terrestrial-based transmitting devices may be acquired by a mobile device while located in an outdoor environment.

With this in mind, the present description also considers a third general type of environment, namely, a "blended" environment, wherein for example, un certain instances, at least one wireless signals transmitted by at least one satellite-based transmitting device and at least one wireless signal transmitted by at least one terrestrial-based transmitting device may be acquired by a mobile device. Hence, all or part of certain indoor environments may be considered to be blended environments. For example, all or part of a covered stadium (e.g., having a roof structure that in sufficiently permeable to SPS signals, and being provisioned with terrestrial-based transmitting devices) may be considered to be a blended environment. In certain instances an area nearby and/or surrounding a boundary between an indoor environment and an adjacent outdoor environment may be considered to be a blended environment. Thus, for example, a blended environment may comprise an area nearby and/or surrounding an entry/exit portal, a window or other aperture, certain types or portions of wall(s) or other like object(s), etc.

With this in mind, in an indoor environment or possibly certain blended environments, a mobile device may, at times, be more successful in obtaining a position fix from wireless signals acquired from certain terrestrial-based transmitters, e.g., located within the indoor environment. On the other hand, a mobile device in an indoor area and/or certain blended environments may not be able to reliably acquire wireless signals from a sufficient number of satellite-based transmitting devices for obtaining a position fix based solely thereon. In some environments (e.g., certain blended environments, etc.), a mobile device may attempt to employ a hybrid positioning technique in which the mobile device may combine measurements obtained from acquisition of one or more wireless signals from one or more satellite-based transmitting devices with measurements obtained from acquisition of one or more wireless signals acquired from one or more terrestrial-based transmitting devices to possibly obtain a position fix.

The techniques presented herein by way of various examples, may be implemented via methods, apparatuses, and/or articles of manufacture to possibly affect a mobile device in its selection of certain signal-based positioning techniques based on one or more externally recommended candidate position fix modes corresponding to a particular region of an environment that the mobile device may be currently within or possibly within in the future.

Attention is drawn to FIG. 1, which is a schematic block diagram illustrating an example arrangement 100 comprising various representative electronic devices, including a mobile device 102 comprising an apparatus 104. As illustrated mobile device 102 is located within a region 106 of an environment 108. Here, for example, all or part of region 106, and/or environment 108, may be representative of various types of indoor environments, various types of outdoor environments, and/or various types of transitional environments. Accordingly, as used herein the term "environment" is intended to represent an environment comprising at least an indoor environment. Thus, for example as used herein an "environment" may comprise an indoor environment and possibly one or more blended environments and/or outdoor environments. Accordingly, for example, as used herein an "environment" may comprise a plurality of regions wherein at least a portion of at least one of the regions corresponds to at least a portion of an indoor environment. Hence, for example, in certain instances an "environment" may comprise a first region that corresponds to at least a portion of an indoor environment, and at least a second region, which may correspond to the same or another portion of the same or another indoor environment, all or part of an outdoor environment, all or part of a blended environment, and/or some combination thereof. In yet another example, in certain instances an "environment" may comprise a first region that is a blended environment that at least partially corresponds to an indoor environment, and at least one other region that corresponds to the same or another blended environment and/or outdoor environment.

As used herein a "mobile device" may represent any electronic device that may be moved about either directly or indirectly by a user and/or some mechanism within environment 108 and which may communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

Arrangement 100 further comprises a plurality of satellite-based transmitting devices represented herein by one or more space vehicles (SVs) 112 of one or more satellite positioning system (SPS) 110 capable of transmitting one or more wireless signals 114.

Arrangement 100 further comprises a plurality of terrestrial-based transmitting devices represented in one instance by one or more access point devices (APs 122) of one or more wireless communication networks 120 capable of transmitting one or more wireless signals 124. In another instance, a plurality of terrestrial-based transmitting devices are illustrated as represented by one or more transmitting devices (TDs) 132 of one or more location based service networks 130 capable of transmitting one or more wireless signals 134. As may be appreciated, mobile device 102 may or may not in certain instances acquire one or more of wireless signals 114, 124 and/or 134, e.g., depending upon various factors relating to environment 108, region 106, mobile device 102, one or more of the transmitting devices, etc.

Arrangement 100 further comprises a representative electronic device 140 comprising an apparatus 142. Electronic device 140 is intended to represent one or more computing platforms that communicate, at times, with mobile device 102 via communication link 144. In certain example implementations, communication link 144 is representative of one or more wired and/or wireless communication links that allow apparatus 142 to transmit and provide certain assistance data 146 to mobile device 102. In certain example implementations, communication link 144 is representative of one or more wired and/or wireless communication links that allow apparatus 104 to transmit certain information (e.g., a request for assistance data, feedback information, etc.) to electronic device 140.

As such, communication link 144 may represent one or more wired and/or wireless communication networks (e.g., a cellular telephone network, a wireless area network, all or part of an intranet and/or the Internet, etc.), one or more applicable communication devices (e.g., a switch, a router, a data storage device, a wireless transmitting device, an undersea cable facility, etc.), one or more applicable computing platforms (e.g., a server, a data storage device, etc.), and/or the like or some combination thereof.

As presented herein, it is assumed that mobile device 102 is capable of selectively operating in at least one of at least three different wireless signal-based positioning modes. In certain example implementations, apparatus 104 may affect selection of a wireless signal-based positioning mode, e.g., based at least in part, on assistance data 146. In certain example, a particular wireless signal-based positioning mode may, at least, affect one or more positioning functions performed by mobile device 102.

By way of example, in certain implementations, mobile device 102 may be capable of selectively operating in a (first) wireless signal-based positioning mode in which mobile device 102 acquires (or attempts to acquire) certain wireless signals (124, 134) transmitted by one or more terrestrial-based transmitting devices (APs 122, TDs 132). Here, for example, a terrestrial-based transmitting device may be part of wireless communication network 120 (which may comprise a cellular telephone system, etc.), a location based, a location based service network 130 (which may comprise a cellular telephone system, etc.), and/or the like or some combination thereof. In certain implementations, when operating in a first wireless signal-based positioning mode, mobile device 102 may also transmit messages to one or more of the terrestrial-based transmitting devices.

Continuing with this example, in certain implementations, mobile device 102 may be capable of selectively operating in a (second) wireless signal-based positioning mode in which mobile device 102 acquires (or attempts to acquire) certain wireless signals 14 transmitted by one or more satellite-based transmitting devices (SVs 112). Here, for example, an SV 112 may be part of SPS 110, examples of which may comprise a GNSS (e.g., GPS, Galileo, Glonass, etc.), and/or the like or some combination thereof.

Again, continuing with this example, in certain implementations, mobile device 102 may be capable of selectively operating in a (third) wireless signal-based positioning mode in which mobile device 102 acquires (or attempts to acquire) certain wireless signals transmitted by a combination of transmitting devices comprising one or more terrestrial-based transmitting devices (e.g., as in the example first wireless signal-based positioning mode), and one or more satellite-based transmitting devices (e.g., as in the example second wireless signal-based positioning mode). Hence, for example, such a third wireless signal-based positioning mode may be referred to as a "hybrid" mode. Here, for example, a hybrid mode may comprise acquiring or attempting to acquire wireless signals (e.g., wireless signal 114 and one or more of wireless signals 124/134) transmitted by the one or more access point devices of one or more wireless communication networks and/or the like, as well as one or more SVs of one or more SPS.

It should be recognized that claimed subject matter is not intended to be limited to the examples provided herein. Indeed, those skilled in the art will recognize that a variety of different techniques (e.g., timing, ranging, signaling, measuring, etc.) may be employed in one or more positioning functions performed by mobile device while operating in a particular wireless signal-based positioning mode. The details of such positioning techniques and/or functions, which are known and continue to evolve, are beyond the scope of the present description. Instead, the present description is intended to illustrate various techniques by which mobile device 102 may, at times, request, receive, and/or otherwise access certain assistance data which is influential to the mobile device in selecting and/or otherwise affecting one or more positioning functions based, at least in part, on a candidate wireless signal-based positioning mode as recommended by electronic device 140 for possible use within a particular region.

With this in mind, as described in greater detail herein, electronic device 140 may be provisioned (e.g., at least in part, by apparatus 142) to recommend certain candidate wireless signal-based positioning modes for use by mobile device 102 in certain regions. Additionally, mobile device 102 may be provisioned (e.g., at least in part, by apparatus 104) to obtain (e.g., request, receive, and/or otherwise access) information indicative of such a recommended candidate wireless signal-based positioning mode, and operatively affect at least one positioning function within mobile device 102 based, at least in part, on such a candidate position fix mode. As used herein the term "wireless signal-based positioning mode" and its shorter version "position fix mode", are used interchangeably.

As pointed out above, one way for electronic device 140 to operatively influence a positioning capability of mobile device 102 may be to recommend a "candidate position fix mode" for use by mobile device 102 when they mobile device is "within" (e.g., within, at, nearby, possibly heading towards, possibly heading away from, etc.) a particular identified region (e.g., region 106) within environment 108 that is navigable by mobile device 102 (e.g., when carried by a user, attached to a particular vehicle/machine, etc.). Hence, by way of example, in certain instances, mobile device 102 may obtain assistance data indicative of one or more candidate position fix modes from electronic device 140 and store such information and its memory for possible subsequent access. In certain example implementations, if possible it may be useful for a mobile device to download or otherwise receive and store certain assistance data in advance of traveling to a particular region(s), e.g., obtaining one or more candidate position fix modes prior to reaching a particular environment, e.g., an airport terminal, a hospital, an office building, etc.

Electronic device 140 may, for example, be provisioned to identify a particular region within an indoor environment (e.g., a building) and suggest a candidate position fix mode that may prove especially useful to mobile device 102 within the identified region. For example, a particular region within an interior portion of a building may be identified in which a "terrestrial" (first) position fix mode (e.g., a WLAN based position fix mode, etc.) may be suggested as a candidate position fix mode since it may be difficult for mobile device 102 within the particular region to acquire wireless signals 114 transmitted by satellite-based transmitting devices due to the attenuating effects of the building's structure, etc. However, in certain other regions of such a building (e.g., near its periphery, nearby window or entryway, nearby an aperture, etc.) certain wireless signals 114 transmitted by satellite-based transmitting devices may be acquired by mobile device 102. Thus, a "hybrid" (third) position fix mode may be suggested as a candidate position fix mode since it may be beneficial for mobile device 102 within such a region to acquire wireless signals from a combination of terrestrial-based and satellite-based transmitting devices (e.g. for use by one or more corresponding hybrid capable positioning function, etc.). Further still, in certain other regions of such a building (e.g. an atrium, a balcony, a rooftop, etc.), a "satellite-based" (second) position fix mode may be suggested as a candidate position fix mode since it may be more beneficial for mobile device within such a region to acquire wireless signals 114 from satellite-based transmitting devices, e.g., as opposed to terrestrial-based transmitting devices which may be provisioned for specific use within certain other areas within the building.

In certain example implementations, electronic device 140 may determine a candidate position fix mode for use by mobile device 102 based on a variety factors, possibly including one or more factors relating to certain physical characteristics of the environment, certain signaling characteristics within the environment, certain operational characteristics of an applicable transmitting device, certain operational characteristics of an applicable mobile device, etc.

One or more of such factors/characteristics and/or the like may, for example, be obtained, modeled, estimated, etc., based on known or presumed information. For example, certain physical characteristics (e.g., structure features, layout, location, etc.) of an environment may be based, at least in part, on information in an electronic map, a routability graph, and/or the like corresponding to at least a portion of the environment, in operating entity for at least a portion of the environment, etc., just to name a few examples.

Alternatively or additionally, certain physical characteristics of an environment and/or certain signaling characteristics within the environment may be based, at least in part, on information gathered by one or more mobile devices while navigating within such an environment. For example, historical navigation observations and/or wireless signaling observations from one or more mobile devices may be indicative of one or more actual and/or inferable physical characteristics within a portion of environment. Indeed, in certain example implementations, a candidate position fix mode and/or one or more regions of environment 108 may be determined and/or otherwise selected based, at least in part, on historical navigation observations and/or wireless signaling observations corresponding to a plurality of mobile devices with regard to at least a portion of an environment. For example, historical navigation observations may indicate more or less popular routes, etc., with regard to the movement of mobile devices within a given environment. As such, in certain instances it may be beneficial to determine one or more regions of such an environment based, at least in part, on applicable historical navigation observations. In another example, wireless signaling observations may indicate whether certain position fix mode modes may be of more or less use, e.g., within a particular portion of an environment, a certain particular period time, etc. As such, in certain instances it may be beneficial to determine one or more regions in an environment and/or one or more candidate position fix modes to recommend based, at least in part, on applicable wireless signaling observations.

Similarly, for example, certain operational characteristics (e.g., identification, location, capabilities, etc.) of an applicable transmitting device may be based, at least in part, on information in one or more device and/or network design documents, information obtained from by such applicable transmitting device itself or some other electronic device, information from service provider, etc., just to name a few examples. Additionally, certain operational characteristics of an applicable transmitting device and/or certain signaling characteristics within the environment may be based, at least in part, on information (e.g., various signal related measurements, various time and/or distance measurements, etc.) gathered by one or more mobile devices which may have acquired or attempted to acquire wireless signals from the transmitting device.

Also similarly, for example, certain operational characteristics (e.g., identification, capabilities, user account, preferences, gathered historical data, etc.) of mobile device 102 may be based, at least in part, on information in one or more device and/or network design documents, information obtained from mobile device 102 itself or some other electronic device, information from a service provider, information from an account user, etc., just to name a few examples.

As mentioned, electronic device 140 may be provisioned to selectively transmit information (e.g., via communication link 144) is indicative of at least one candidate position fix mode to mobile device 102, possibly as part of some predetermined/advanced download, possibly in response to a request for such information, and/or possibly in response to some schedule, update cycle, event, etc. Here, for example, such a candidate position fix mode may be provided as part of, and/or as a type of, assistance data 146 in one or more messages, data files, and/or the like or some combination thereof. In certain instances, for example, assistance data 146 may comprise other information, e.g., electronic map, a routability graph, a signaling-related probability heatmap or radio map, etc., just to name a few examples. In certain instances, assistance data 146 may be transmitted over indication link 144 to mobile device 102, and/or possibly provided via a computer readable medium accessible by mobile device 102.

In certain example implementations, a request from mobile device 102 may be indicative of an initial estimated position fix of mobile device 102 (e.g., one or more indications corresponding to: a rough estimate of its position, a range or pseudo-range, the last known position fix, an estimated latitude, an estimated longitude, an estimated or possibly measured altitude, an estimated nearby node, a currently serving and/or recently serving cell and/or cellular base station, a user input, etc.), an initial estimated course of mobile device 102 (e.g., one or more indications corresponding to: a rough estimate of its velocity and/or heading, inertial sensor-based movements, compass readings, etc.). In certain instances, such an initial estimated position fix and/or initial estimated course of mobile device 102 may be have been determined by mobile device 102 on its own or possibly with assistance from one or more other electronic devices (e.g., possibly within networks 120/130, etc.).

In certain example implementations, a request from mobile device 102 may be indicative of one or more initial wireless signal observations gathered by the mobile device. Here, for example, mobile device 102 may gather one or more initial wireless signal observations (e.g., measured signal characteristics, etc.) from its immediate surroundings and include some indication thereof within the request for assistance data comprising candidate position fix mode. As such, an example electronic device 140 may consider such initial wireless signal observations, at least in part, in possibly determining an initial estimated position fix and/or initial estimated course of a mobile device, e.g., knowledge of which may be useful in selecting a more likely useful candidate position fix mode and/or corresponding region of environment for the mobile device. Regardless as to the source of an initial estimated position fix and/or an initial estimated course of mobile device 102, in certain example implementations, electronic device 140 may select a candidate position fix mode for a particular mobile device based, at least in part, on an initial estimated position fix of the mobile device, an initial estimated course of the mobile device, and/or the like or some combination thereof.

In certain example implementations, a request from mobile device 102 to electronic device 140 for assistance data indicative of candidate position fix models) for particular region(s) may indicate all or part of: a particular identified environment, a particular identified structure, a particular business or entity or service, a particular physical address, a particular location context identifier (LCI), and/or the like or some combination thereof. An LCI may represent for example a building structure, an entire floor of a particular building, or various wings of a different building. Some buildings may have a single LCI indexing a single floor plan while other buildings have multiple LCIs each corresponding to a different logical part the building. Thus, in certain instances, in addition to or alternative to indicating an initial estimated position and/or initial estimated course of the mobile device, a request may be indicative of one or more particular target destinations. For example, as previously mentioned, it may be beneficial to obtain certain access data in anticipation of visiting a particular environment, e.g., airport terminal, office building, etc. In certain implementations, such a request may be based on a perceived/likely destination based on one or more positioning functions, a perceived/likely destination based on one or more user inputs and/or preferences, a perceived/likely destination based certain events (e.g., scheduled appointments/meetings recorded on electronic calendar, etc.), and/or the like or some combination thereof.

In certain instances, for example, a candidate position fix mode and/or other assistance data may be indicative of one or more (applicable) identified regions of an environment. By way of example, in certain instances a candidate position fix mode and/or other assistance data may be indicative of a geo-fence boundary (e.g., map coordinates, distances, etc.) corresponding to at least a portion of at least one identified region of an environment. By way of example, in certain instances a region may be identified based, at least in part, on one or more structure feature related identifiers (e.g., identifying a building, a particular portion and/or floor of a building, a particular room, etc.), a node related identifier (e.g., corresponding to a point or part on a map, a grid or other like pattern of interconnected points or parts, a routability graph, a probability heatmap or you map, etc.), an environment related identifier (e.g., an indoor environment, an outdoor environment, a blended environment, an electromagnetically shielded or unshielded environment, a particular business, service or entity related environment etc.), and/or the like or some combination thereof. In certain instances, for example a region may be identified based, at least in part, on a LCI and/or the like, which may correspond to a particular portion of an environment, etc., and which may be associated in certain instances with one or more location based services and/or the like.

In certain example implementations, a candidate position fix mode and/or other assistance data may be indicative of one or more conditional attributes, which may correspond in some manner to a particular candidate position fix mode, one or more identified regions, one or more terrestrial-based transmitting devices (APs 122, TDs 132), one or more satellite-based transmitting devices (SVs 112), mobile device 102, and/or the like or some combination thereof. For example, a conditional attribute may indicate that a suggestion to use a particular candidate position fix mode may be a conditioned based upon a period of time, a date, a day, a time, an atmospheric condition, etc. By way of example, in certain situations a terrestrial-based transmitting device may change its transmit power level, possibly affecting a mobile device's ability to acquire wireless signals transmitted by such transmitting device at times. For example, an operator of a wireless communication network may reduce a transmit power level of one or more access point devices during certain periods of time, e.g. to reduce power usage. In another example, a conditional attribute may indicate that a particular terrestrial-based and/or satellite-based transmitting device may be off-line for servicing, etc., and hence not transmitting wireless signals during certain periods of time.

In another example, one or more conditional attributes may indicate certain operational and/or security-related aspects that may need to be satisfied and/or verified prior to and/or as part of an exchange of wireless signals with a mobile device. Here for example, certain wireless communication networks may implement certain security protocols that may limit access to one or more of its transmitting devices. In yet another example, conditional attribute may indicate certain capabilities that may prove necessary or beneficial for mobile device 102 in certain situations. For example, a conditional attribute may indicate that a candidate position fix mode may prove more (or possibly less) beneficial to a mobile device comprising a particular transmitter and/or receiver capability, antenna gain, etc. Similarly, a conditional attribute may indicate that a candidate position fix mode may prove more (or possibly less) beneficial to a mobile device comprising adequate operational resources, e.g., sufficient processing capability, sufficient memory, sufficient power reserves, etc. In yet another example, one or more conditional attributes may indicate whether a candidate position fix mode may (or may not) conflict with other possible operational modes of a mobile device, e.g., an emergency operation mode, an airport mode, a reserve power mode, etc.

In certain example implementations, a candidate position fix mode and/or one or more regions of an environment may be selected and/or otherwise determined based, at least in part, on a service related identifier and/or the like corresponding to a particular transmitting device and/or its applicable network/service. Hence, in certain instances a first service related identifier may correspond to a terrestrial-based transmitting device, and based, at least in part, on such identifier certain aspects associated with the operation of the transmitting device and/or its applicable network/service may be determined indoor identifiable and such information may affect selection of candidate position fix mode and/or a particular region. For example, a first service related identifier may distinguish a particular terrestrial-based transmitting device as having a known or determinable location and/or operational capability. Similarly, for example, a second service related identifier corresponding to a satellite-based transmitting device (e.g., SV) and/or its applicable SPS may distinguish such SV/SPS is having a known or determinable location and/or operational capability. Clearly, such distinguishing characteristics and/or other like identifiable or possibly presumable operational characteristics may be taken into consideration, at least in part, in selecting a candidate position fix mode and/or a corresponding region.

In certain example implementations, a candidate position fix mode and/or one or more regions of an environment may be selected and/or otherwise determined based, at least in part, on a mobile device capability related identifier corresponding to a particular mobile device and/or particular service apportioned for such mobile device, a particular type of mobile devices and/or particular types of services apportioned for such mobile devices, etc. For example, a mobile device capability related identifier may be indicative of a type of mobile device, one or more service providers associated with the mobile device, a user account associated with a mobile device, one or more capabilities of the mobile device, etc. In certain instances, a mobile device capability related identifier may represent and/or otherwise be taken into consideration as a possible conditional attribute. In certain instances, a mobile device capability related identifier may be obtained via a request for assistance data comprising a candidate position fix mode.

Figure 2:
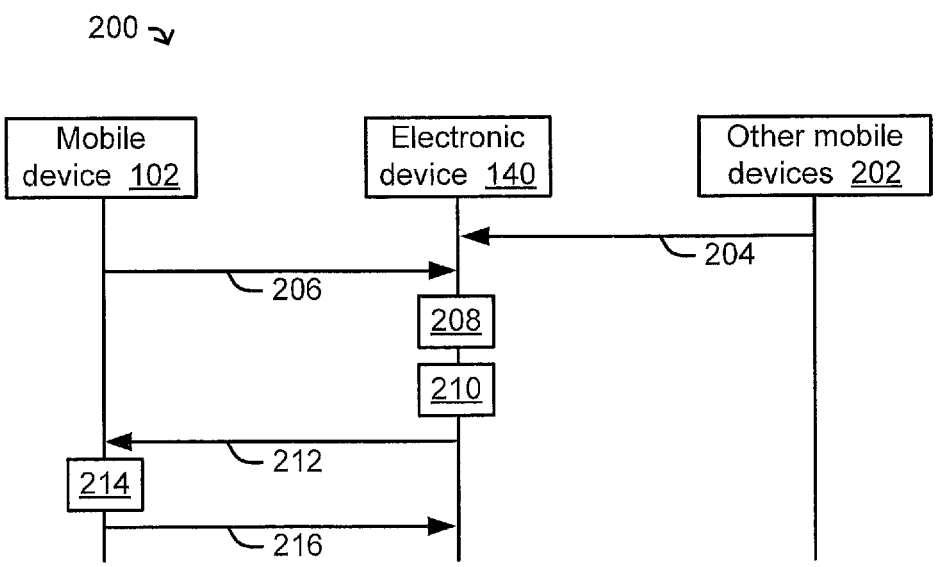
FIG. 2 comprises an example information flow corresponding to a mobile device to receive and/or otherwise access, and make use of, a recommended candidate position fix mode, in accordance with an example implementation.

Attention is drawn next to FIG. 2, which illustrates at example information flow 200 between electronic device 140 and mobile device 102, as well as between electronic device 140 and one or more other mobile devices 202.

In this example, one or more other mobile devices 202 may at various times transmit one or more messages 204 that may be indicative of historical navigation observations and/or wireless signaling observations, e.g., with regard to a particular environment. In certain implementations, messages 204 may represent a crowd-sourcing and/or other like effort, in which a plurality of mobile devices may join in an effort to assist electronic device 140 in determining applicable regions within an environment, and/or one or more candidate position fix modes for possible beneficial use therein. By way of example, electronic device 140 may at example block 208, determine (at least in part) sees one or more regions within an environment, and/or at example block 210 determine (at least in part) one or more candidate position fix modes.

In accordance with certain example implementations, a crowd-sourcing and/or other like effort may gather, analyze, model, and/or otherwise process various types of information that may be beneficial in identifying a particular region and/or candidate position fix mode. By way of example, in certain instances a crowd-sourcing effort may gather and/or otherwise consider estimated positions of reporting mobile devices, successful and/or unsuccessful position fix mode modes of the reporting mobile devices (e.g., a mode identifier, a success or failure identifier, particular settings, etc.), time information (e.g., date, time a day, etc.), identification of detected transmitting devices (e.g., MAC addresses, etc.), various measurements associated with acquired wireless signals (e.g., signal strength measurements, frequency measurements, phase measurements, round trip time measurements, etc.), information transmitted from the transmitting device (e.g., a reported transmit power, etc.), and/or the like or some combination thereof. In certain example implementations, the crowd-sourcing effort may gather and/or otherwise consider the reported number of visible SVs, signal-to-noise ratios for one or more SV transmitted wireless signals, one or more pseudoranges (e.g., from the mobile device to an SV), one or more position uncertainty measurements/estimates, etc.

In certain example implementations, a crowd-sourcing effort may provide enough insight to allow for further refinement of a candidate position fix mode under certain conditions. By way of example in certain instances a candidate position fix mode may go beyond simply recommending a particular wireless signal transmitting device and/or one or more corresponding network/systems, by further recommending the use of received signal strength indication (RSSI) based positioning techniques rather than round trip time (RTT) based positioning techniques, or possibly RTT based positioning techniques rather than RSSI-based positioning techniques, or possibly even a particular combination thereof for a particular set of transmitting devices. In another example, in certain implementations, a candidate position fix mode may include recommending a particular SPS 110 or particular SVs 112 from one or more SPS, e.g. which may be of particular benefit to a hybrid positioning function, e.g., by identifying certain SVs 112, APs 122, TDs 132, whose transmitted wireless signals may be quickly acquired and/or which may provide for improved positioning accuracy as result of considering wireless signals from a set of well distributed (angularly) transmitting devices.

In example information flow 200, mobile device 102 may transmit one or more messages 206 to electronic device 140 that may be indicative of a request for assistance data 146 comprising a candidate position fix mode. As previously mentioned, in certain instances, an example request may be indicative of an initial estimated position and/or an initial estimated course of mobile device 102. In certain instances, an example request may be indicative of one or more signaling observations, which may allow electronic device 140 to estimate, at least in part, an initial estimated position and/or an initial estimated course of mobile device 102. In certain instances, an example request may be indicative of one or more capabilities and/or other characteristics corresponding to mobile device 102, a user, a service provider, etc.

As previously mentioned, electronic device 140 may, for example at blocks 208/210, determine one or more candidate position fix modes for use in one or more regions of an environment based, for example, on a variety of factors and/or considerations. As mentioned, certain candidate position fix modes may be conditionally recommended based on certain constraints, etc. In certain example implementations, a candidate position fix mode and/or its applicable region may be predetermined, e.g., based on sufficiently static historical observations and/or trusted predictions, possibly for use by all or certain mobile devices; etc. In certain example implementations, a candidate position fix mode and/or its applicable region may be dynamically determined, e.g., based on timely historical observations, particular information obtained in a request, certain presumptions about the particular mobile device or plurality of mobile devices; possibly for use by one or more mobile devices, etc.

It should be noted that in certain instances, mobile device 102 may not necessarily provide a request to electronic device 140. Instead, in certain instances, electronic device 140 may be tasked with providing assistance data 146 to one or more mobile devices sans a request, e.g., providing such assistance data 146 from time to time (e.g., possibly according to a schedule, a periodicity, an update cycle, etc.), upon an occurrence of one or more events (e.g., a change in an identified region, a change in a recommended candidate position fix mode, one or more conditional reasons, etc.), and/or the like or some combination thereof.

With this in mind, in example information flow 200 electronic device 140 may transmit one or more messages 212 indicative of assistance data 146 comprising candidate position fix mode to mobile device 102. As previously mentioned, in certain instances a candidate position fix mode may be indicative of its corresponding region and/or other conditional information corresponding to its potential use. As previously mentioned, in certain instances, assistance data 146 may comprise additional information (e.g., electronic map, etc.) that may be of use to mobile device 102, particularly with regard to environment 108.

As illustrated in example information flow 200, at example block 214, mobile device 102 may affect one or more positioning functions based at least in part, on information obtained in assistance data 146. By way of example, apparatus 104 and mobile device 102 may affect a positioning function based, at least in part, on a candidate position function indicated by assistance data 146.

As further illustrated in example information flow 200, in certain example implementations, mobile device 102 may subsequently transmit one or more messages 216 to electronic device 140, e.g., to possibly provide feedback regarding all or part of assistance data 146, report certain historical navigation observations, report certain wireless signaling observations, request other assistance data, etc. Consequently, in certain instances, electronic device 140 may affect functions represented by blocks 208/210, which may identify particular regions within an environment and determine candidate position function modes for possible use therein, based on feedback and/or other like information obtained by a message(s) 216. Furthermore, in certain implementations, in response to one or more messages 216 from mobile device 102, electronic device 140 may transmit one or more additional messages 212 indicative of one or more newly determined and/or other recommended candidate position fix modes, e.g., determined and/or selected based, at least in part, on feedback obtained via message(s) 216. In a slightly different variation of implementation design, in certain instances one or more messages 216 comprising feedback and/or other like information may, at times, be considered to represent a request for new/additional assistance data comprising a candidate position fix mode, e.g., determined and/or selected based, at least in part, on the feedback and/or the like information.

Example block 214 may be representative of a positioning function which may be performed, at least in part, by mobile device 102 and which may be affected by apparatus 104, e.g., based on assistance data 146 indicative of a candidate position fix mode recommended by electronic device 140. In certain example implementations, a positioning function may, for example, implement certain mobile device-based positioning techniques in which processing may be performed by mobile device 102 without additional processing support from one or more other electronic devices. In certain other example implementations, a positioning function may, for example, implement certain network-assisted positioning techniques in which at least a portion of the corresponding processing may be performed by one or more other electronic devices. Such positioning techniques are well known and vary in their particular details, and are beyond the scope of the present description.

Figure 3:
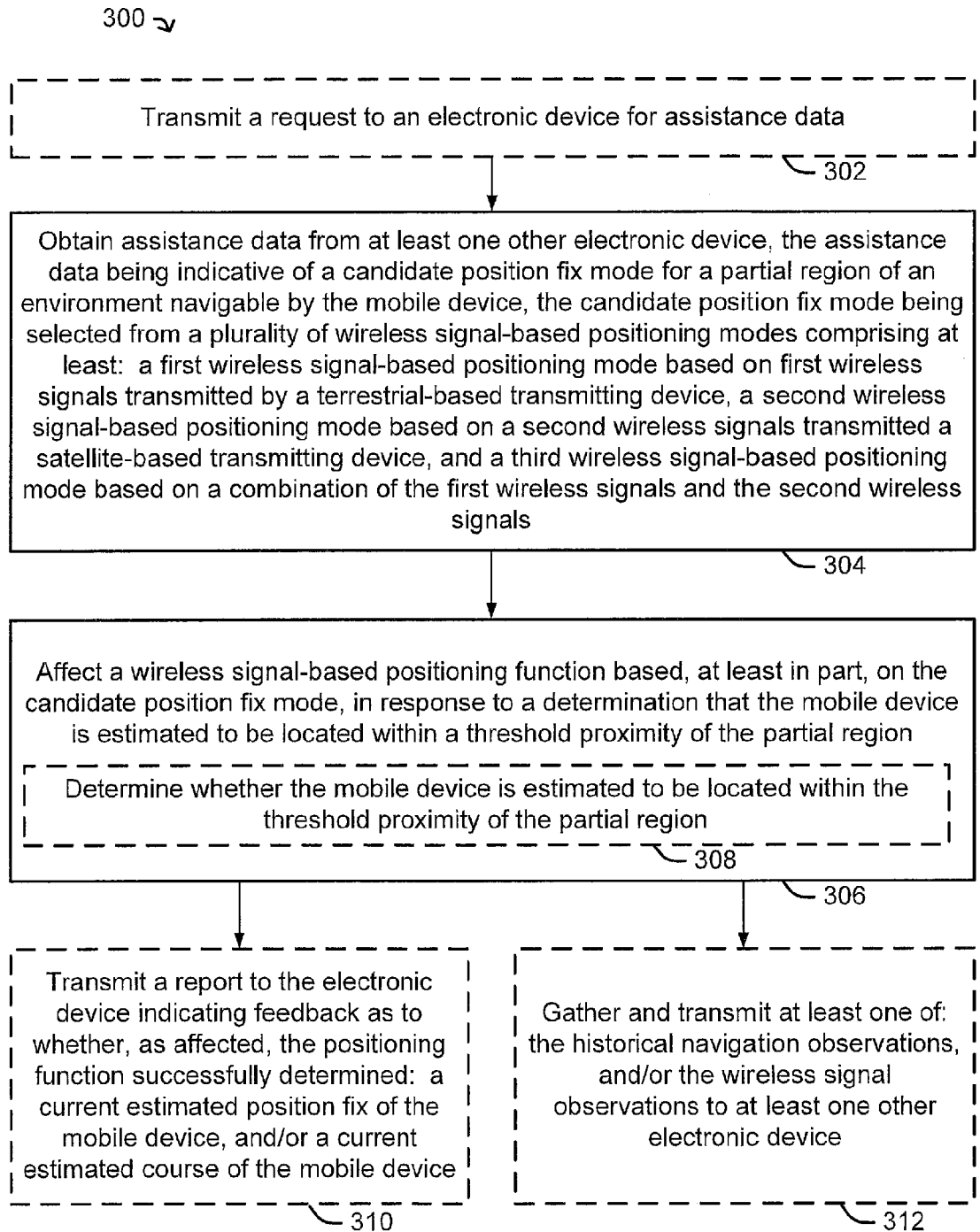
FIG. 3 is a flow diagram illustrating an example process that may implemented within a mobile device to receive and/or otherwise access, and make use, of a recommended candidate position fix mode, in accordance with an example implementation.

Attention is drawn next to FIG. 3, which is a flow diagram illustrating an example process 300 that may be implemented, in whole or in part, by apparatus 104 and/or example block 214 of representative electronic device 140 (e.g. see FIG. 1 and FIG. 2). In example process 300, in certain implementations, blocks illustrated using dashed-line boxes may be optional.

At example block 302, mobile device 102 may transmit a request for assistance data to electronic device 140. As mentioned, in certain instances a request for assistance data may be indicative of an initial estimated position, an initial estimated course of a mobile device, an expected and/or otherwise presumed likely route and/or destination, certain characteristics regarding mobile device 102 and/or its user, etc., and/or the like or some combination thereof.

At example block 304, mobile device 102 may obtain assistance data indicative of the candidate position fix mode for a partial region of an environment which may be navigable by the mobile device. In certain instances, the candidate position fix mode may identify such a partial region. As mentioned, such a candidate position fix mode may be generated by electronic device 140. Here, for example, electronic device 140 may determine one or more partial regions and/or one or more candidate position fix modes for recommended use therein by a mobile device based on various factors, e.g. possibly relating to a particular mobile device or particular type of mobile device, applicable terrestrial-based and/or satellite-based transmitting devices, various aspects indoor features/characteristics within environment 108, historical/crowd-sourced feedback/information from various mobile devices, etc. As previously mentioned, in certain instances a candidate position fix mode may have been generated and obtained in advance (or without ever needing) a request, e.g. as transmitted in example block 302. However, in certain instances a candidate fix mode may be generated by electronic device 140 (and subsequently obtained by mobile device 102) in response to, a particular request for assistance data comprising one or more candidate position fix modes, e.g., as transmitted in example block 302.

At example block 306, a positioning function that may be performed by mobile device 102 may be affected based, at least in part, on a candidate position fix mode, e.g. as obtained in example block 304. In certain instances, one or more conditions may need to be satisfied higher to affecting a positioning function in example block 306. By way of example, in certain instances, mobile device 102 may affect a positioning function in example block 306 in response to a determination that mobile device 102 is estimated to be located within a threshold proximity of the partial region corresponding to a candidate position fix mode, e.g., as in example block 308. Here, for example, a mobile device may determine that it is estimated to be located within a threshold proximity of a partial region based, at least in part, on positioning information obtained via one or more positioning functions and/or obtained from one or more other electronic devices, movement information obtained via one or more onboard inertial and/or environmental sensors, user input, one or more particular wireless signals being acquired, one or more wireless signaling observations, receiving assistance data (e.g., at block 304), and/or the like or some combination thereof, just to name a few examples.

Further, as previously mentioned, in certain instances, at example block 306, a positioning function may be affected based on one or more various conditions being satisfied, e.g., a particular period of time, a particular day/date, etc.

In certain instances, at example block 306, a positioning function may be affected based on a candidate position fix mode to possibly search for certain particular wireless signals, possibly make use of certain particular wireless signals, make use of certain positioning techniques, etc., e.g., as may be indicated by or inferred from the candidate position fix mode.

At example block 310, mobile device 102 may transmit a report to an electronic device indicating certain feedback, e.g., indicating whether or not a positioning function (as affected at example block 306) succeeded, at least in part, in allowing mobile device 102 to successfully determine a current estimated position fix, current estimated course, and/or the like.

At example block 312, mobile device 102 may gather and transmit historical navigation observations, wireless signaling observations, and/or the like or some combination thereof to electronic device 140. In certain instances, example block 312 may be initiated as part of a crowd-sourcing task and/or the like which may gather information beneficial to electronic device 140 in selecting and/or otherwise determining candidate position fix modes and/or identifying partial regions corresponding thereto within an environment.

Figure 4:
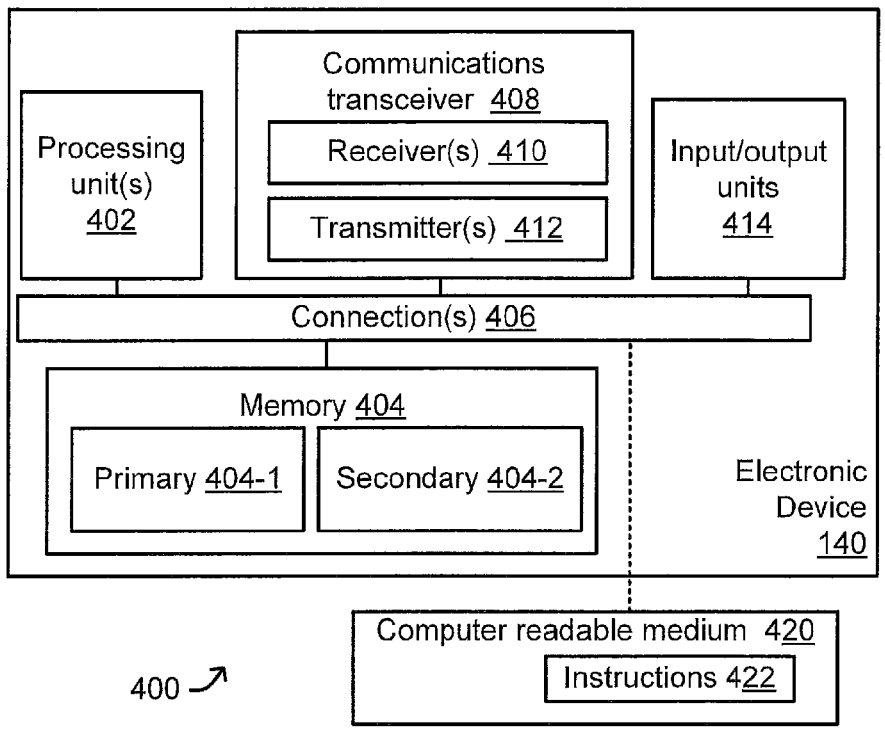
FIG. 4 is a schematic diagram illustrating certain features of an example electronic device to determine and transmit a recommended candidate position fix mode to a mobile device for use in a particular region of an environment, in accordance with an example implementation.

Attention is now drawn to FIG. 4, which is a schematic block diagram illustrating certain features of an example electronic device 140, which in certain example implementations may comprise a special computing platform 400, and/or the like with apparatus 142 provisioned therein.

As illustrated electronic device 140 may comprise one or more processing units 402 (e.g., to perform data processing in accordance with the techniques provided herein, apparatus 104) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located/coupled with processing unit(s) 402, or other like circuitry within electronic device 140. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Electronic device 140 may, for example, further comprise one or more communications transceiver(s) 408. Communications transceiver(s) 408 may, for example, comprise one or more wired and/or wireless communication interfaces, represented here by one or more receivers 410 and one or more transmitters 412. It should be understood that in certain implementations, communications transceiver 408 may comprise one or more transceivers, and/or the like. Further, it should be understood that although not shown, communications transceiver 408 may comprise one or more antennas and/or other circuitry as may be applicable given the communication interface function/capability.

In accordance with certain example implementations, communications transceiver(s) 408 may, for example, be enabled for use with various wired communication networks, e.g., such as telephone system, a local area network, a wide area network, a personal area network, an intranet, the Internet, etc.

Accordance with certain example implementations communications transceiver(s) 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communications transceiver(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Electronic device 140 may, for example, further comprise one or more input/output units 414. Input/output units 414 may represent one or more devices or other like mechanisms that may be used to obtain inputs from and/or provide outputs to one or more other devices and/or a user. Thus, for example, input/output units 414 may comprise various buttons, switches, a touch pad, a trackball, a joystick, a touch screen, a keyboard, and/or the like, which may be used to receive one or more user inputs. In certain instances, input/output units 414 may comprise various devices that may be used in producing a visual output, an audible output, and/or a tactile output for a user. For example, input/output units 414 may be used to present a video display, graphical user interface, etc., on a display mechanism.

Figure 5:
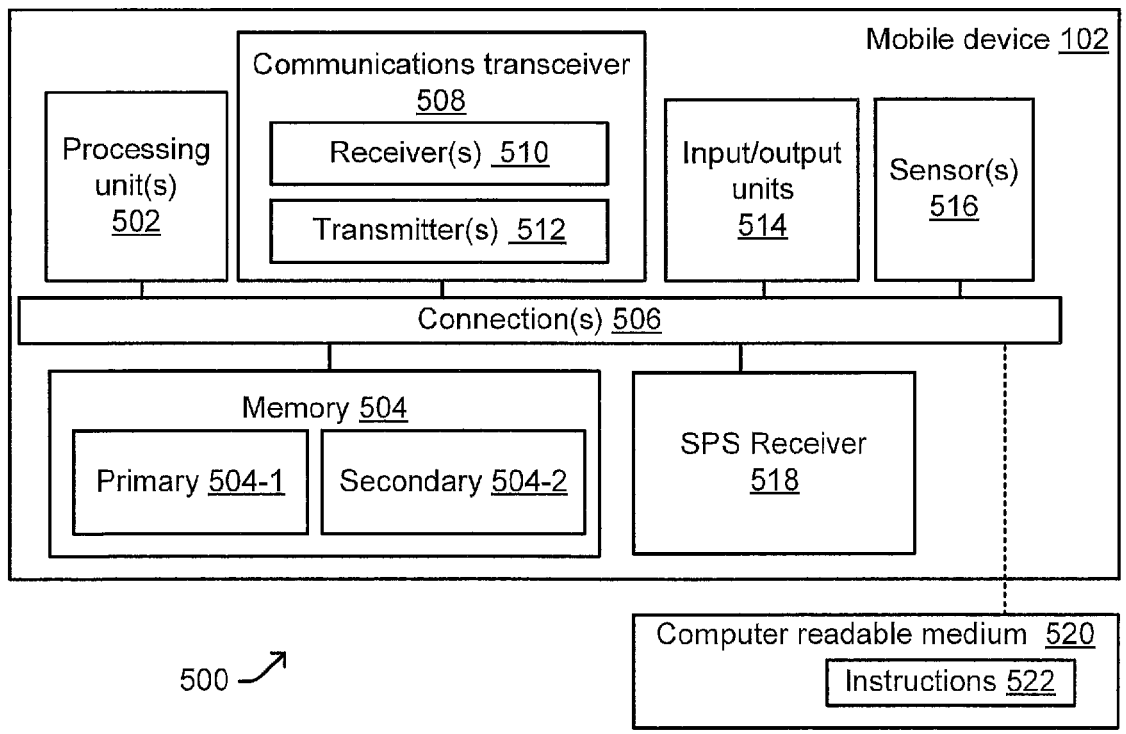
FIG. 5 is a schematic diagram illustrating certain features of an example mobile device to receive and/or otherwise access, and make use, of a recommended candidate position fix mode, in accordance with an example implementation.

Attention is now drawn to FIG. 5, which is a schematic block diagram illustrating certain features of mobile device 102, which in certain example implementations may comprise a special computing platform 500, and/or the like with apparatus 104 provisioned therein.

As illustrated mobile device 102 may comprise one or more processing units 502 (e.g., to perform data processing in accordance with the techniques provided herein, apparatus 104) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located/coupled with processing unit(s) 502, or other like circuitry within electronic device 150. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 520. Memory 504 and/or non-transitory computer readable medium 520 may comprise instructions 522 for use in performing data processing, e.g., in accordance with the applicable techniques as provided herein.

As previously mentioned, in certain example implementations assistance data indicative of a recommended candidate position fix mode may be obtained by mobile device 102 by way of one or more computer readable mediums. Thus, by way of example, in certain instances non-transitory computer readable medium 520 may represent a computer readable medium, such as, e.g. as non-transitory computer readable medium 420 (FIG. 4), which may be used to transfer certain assistance data from electronic device 140 mobile device 102. Such data transfer techniques are well known and beyond the scope of the present description.

Mobile device 102 may, for example, further comprise one or more communications transceiver 508. Communications transceiver 508 may, for example, comprise one or more wired and/or wireless communication interfaces, represented here by one or more receivers 510 and one or more transmitters 512. It should be understood that in certain implementations, communications transceiver 508 may comprise one or more transceivers, and/or the like. Further, it should be understood that although not shown, communications transceiver 508 may comprise one or more antennas and/or other circuitry as may be applicable given the communication interface function/capability.

In accordance with certain example implementations, communications transceiver 508 may, for example, be enabled for use with various wired communication networks, e.g., such as telephone system, a local area network, a wide area network, a personal area network, an intranet, the Internet, etc.

Mobile device 102 may, for example, further comprise one or more input/output units 514. Input/output units 514 may represent one or more devices or other like mechanisms that may be used to obtain inputs from and/or provide outputs to one or more other devices and/or a user. Thus, for example, input/output units 514 may comprise various buttons, switches, a touch pad, a trackball, a joystick, a touch screen, a keyboard, a microphone, a camera, and/or the like, which may be used to receive one or more user inputs. In certain instances, input/output units 514 may comprise various devices that may be used in producing a visual output, an audible output, and/or a tactile output for a user. For example, input/output units 514 may be used to present a video display, graphical user interface, positioning and/or navigation related information, visual representations of electronic map, routing directions, etc., via a display mechanism and/or audio mechanism.

Mobile device 102 may, for example, comprise one or more sensors 516. For example, sensor(s) 516 may represent one or more inertial sensors, one or more environmental sensors, etc., which may be useful in detecting aspects of the environment 108 and/or movements of mobile device 102 therein. Thus for example, sensor(s) 516 may comprise one or more accelerometers, one or one or more gyroscopes or gyrometers, one or more magnetometers and/or the like, one or more barometers, one or more thermometers, etc. Further, in certain instances sensor(s) 516 may comprise one or more input devices such as a microphone, a camera, a light sensor, etc.

SPS receiver 518 may be capable of acquiring and acquiring wireless signals 114 via one or more antennas (not shown). SPS receiver 518 may also process, in whole or in part, acquired wireless signals 114 for estimating a position and/or a motion of mobile device 102. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 502, memory 504, etc., in conjunction with SPS receiver 518. Storage of SPS or other signals for use in performing positioning operations may be performed in memory 504 or registers (not shown).

Sensors five and six may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and downconverted at receiver(s) 510 of communications transceiver 508 or SPS receiver 509. Similarly, a modem processor or the like may perform baseband processing of signals to be upconverted for transmission by (wireless) transmitter(s) 512. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

As illustrated in various examples provided herein, in certain example implementations assistance data may be further indicative of one or more candidate position fix modes for one or more regions of an environment navigable by a mobile device. In certain instances, assistance data may comprise an electronic map corresponding to at least a portion of an environment. Here, for example, electronic map may comprise a routability graph, a presentation map, a radio heatmap, and/or the like, or some combination thereof. In certain instances, assistance data may, for example, comprise one or more annotation files in/or the like which may correspond to at least a portion of an electronic map. In certain example implementations, a candidate position fix mode may, for example, correspond to one or more positioning nodes that may be identifiable within an electronic map. In certain instances, assistance data may, for example, indicate a particular candidate position fix mode via an identifier which may be assigned to such a candidate position fix mode.

By way of still further example, let us consider an example instance wherein a mobile device provides onboard positioning and that the mobile device is inside a building. In this case, a positioning engine and/or the like provisioned in the mobile device may, for example, use WiFi RSSI and range measurements in a Particle Filter once a likely floor of the building has been chosen. Here, for example, an electronic map may comprise a grid with nodes at intersecting lines, e.g., such that the nodes spaced apart by some distance (note that in certain other implementations, notes may be provided which are not necessarily uniformly spaced from one another). Further, let us assume that a likely altitude of the floor may be known. An RSSI and range heatmaps may, for example, specify a mean value and standard deviation at each node and a positioning function may calculate a measurement likelihood, e.g., based on a difference function between expected and received measurements. If SPS is to be added to such example implementation, at each node, an expected range may be calculated since satellite positions are known or otherwise determinable. As such, expected ranges may be compared to measured pseudoranges, e.g., to determine measurement likelihoods. A clock offset between the mobile device and an SV may also be tracked. Assistance data may, for example, be requested and obtained by the mobile device once the mobile device decides on a likely LCI or floor. In certain instances, such assistance data may comprise heatmaps and/or the like for applicable transmitting devices, a presentation map, a routability graph, etc. If SPS is added to be considered, such assistance data may indicate a particular candidate position fix mode in one or more of such electronic maps, one or more annotation files, etc. In certain instances, a candidate position fix mode may be specified on a node per node basis, or possibly a group of nodes basis, etc. For example, in certain instances a candidate position fix mode may indicate that for a first node, or possibly a first group are set of nodes, etc., that a WiFi only position fix mode is recommended, and that for a second node, or possibly second group are set of nodes, etc., that a blended mode, e.g., possibly a WiFi/GNSS position fix mode may be recommended. Indeed, in certain instances, an identifier may be provided on a node per node, group of node, etc., basis to indicate a candidate position fix mode as recommended by an external electronic device. For example, in certain instances a certain number of bits, or other like indicators, may be reserved, provided, added, annotated, etc., in one or more electronic maps and/or the like to indicate a candidate position fix mode on a node per node, group of nodes, identifiable partial region, etc. For example, a three bit indicator may be applied to a node to indicate various candidate position fix modes, e.g. such as, a WiFi RSSI only, a Wifi RSSI+RTT, a WiFi RTT+GNSS RTT, and so on, just to name a few examples.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a mobile device;
    transmitting a request, said request comprising one or more indicators indicative of an initial estimated location of said mobile device or an initial estimated course of said mobile device, or any combination thereof;
    obtaining assistance data from at least one other electronic device transmitted in response to said request, said assistance data being indicative of a candidate position fix mode for a partial region of an environment navigable by said mobile device, said candidate position fix mode being selected by said at least one other electronic device from a plurality of wireless signal-based positioning modes based, at least in part, on the one or more indicators;
    affecting a wireless signal-based positioning function based, at least in part, on said candidate position fix mode, in response to a determination that said mobile device is estimated to be located within a threshold proximity of said partial region; and
    subsequent to said affecting said wireless signal-based positioning function based, at least in part, on said candidate position fix mode, transmitting a report to said at least one other electronic device, said report being indicative as to whether, as affected, said wireless signal-based positioning function successfully determines: a current estimated position fix of said mobile device or a current estimated course of said mobile device, or any combination thereof.

2. The method as recited in claim 1, wherein said assistance data is further indicative of at least one other candidate position fix mode for at least one other partial region of said environment navigable by said mobile device.

3. The method as recited in claim 1, wherein said assistance data comprises:
    an electronic map corresponding to at least a portion of said environment; or
    an annotation file corresponding to at least a portion of said electronic map;
    or any combination thereof.

4. The method as recited in claim 1, wherein said candidate position fix mode corresponds to one or more positioning nodes identifiable within an electronic map corresponding to said environment.

5. The method as recited in claim 1, wherein said assistance data indicates said candidate position fix mode via an identifier assigned to one of said plurality of wireless signal-based positioning modes.

6. The method as recited in claim 1, wherein said one or more indicators are further indicative of at least one wireless signal observation gathered by said mobile device.

7. The method as recited in claim 1, wherein said one or more indicators are further indicative of a mobile device capability related identifier corresponding to said mobile device.

8. The method as recited in claim 1, wherein said candidate position fix mode is indicative of said partial region.

9. The method as recited in claim 8, wherein said candidate position fix mode is indicative of a geo-fence boundary corresponding to at least a portion of said partial region.

10. The method as recited in claim 8, wherein said candidate position fix mode is indicative of said partial region with regard to an electronic map corresponding to at least a portion of said environment.

11. The method as recited in claim 8, wherein said candidate position fix mode is indicative of said partial region with regard to: a structure feature related identifier, a node related identifier, an environment related identifier or a location context identifier (LCI), or any combination thereof.

12. The method as recited in claim 8, wherein said candidate position fix mode is indicative of said partial region with regard to: a first service related identifier corresponding to said terrestrial-based transmitting device, a second service related identifier corresponding to said satellite-based transmitting device or a mobile device capability related identifier corresponding to said mobile device, or any combination thereof.

13. The method as recited in claim 1, wherein said candidate position fix mode is indicative of a conditional attribute corresponding to: said candidate position fix mode, said partial region, said terrestrial-based transmitting device, said satellite-based transmitting device or said mobile device, or any combination thereof.

14. The method as recited in claim 1, wherein said partial region has been identified based, at least in part, on at least one of historical navigation observations, and/or wireless signal observations corresponding to a plurality of mobile devices with regard to said environment.

15. The method as recited in claim 1, and further comprising, with said mobile device:
gathering: historical navigation observations or wireless signal observations, or any combination thereof; and,
transmitting said historical navigation observations or said wireless signal observations, or any combination thereof, to said at least one other electronic device.

16. The method as recited in claim 1, wherein said assistance data is indicative of an initial estimated position fix of said mobile device or an initial estimated course of said mobile device, or any combination thereof.

17. The method as recited in claim 1, wherein said assistance data is indicative of said determination that said mobile device is estimated to be located within said threshold proximity of said partial region.

18. The method as recited in claim 1, wherein at least a portion of said environment comprises a blended environment, and said blended environment comprises said partial region.

19. The method as recited in claim 1, wherein said terrestrial-based transmitting device comprises an access point device of a wireless communication network; and/or said satellite-based transmitting device is part of a space positioning system (SPS).

20. The method of claim 1, wherein, said plurality of wireless signal-based positioning modes comprises:
a first wireless signal-based positioning mode based on first wireless signals transmitted by a terrestrial-based transmitting device,
a second wireless signal-based positioning mode based on a second wireless signals transmitted by a satellite-based transmitting device, and
a third wireless signal-based positioning mode based on a combination of said first wireless signals and said second wireless signals.

21. A mobile device comprising:
a communications transceiver; and
a processing unit configured to:
initiate transmission of a request, said request comprising one or more indicators of an initial estimated location of said mobile device or an initial estimated course of said mobile device, or any combination thereof;
obtain, via said communications transceiver, assistance data from at least one other electronic device transmitted in response to said request, said assistance data being indicative of a candidate position fix mode for a partial region of an environment navigable by said mobile device;
in response to a determination that said mobile device is estimated to be located within a threshold proximity of said partial region, affect a positioning function based, at least in part, on said candidate position fix mode; and
initiate transmission of a report through said communications transceiver to said at least one other electronic device, said report being indicative as to whether, as affected, said wireless signal-based positioning function successfully determines: a current estimated position fix of said mobile device or a current estimated course of said mobile device, or any combination thereof.

22. The mobile device as recited in claim 21, wherein said assistance data is further indicative of at least one other candidate position fix mode for at least one other partial region of said environment navigable by said mobile device.

23. The mobile device as recited in claim 21, wherein said assistance data comprises:
an electronic map corresponding to at least a portion of said environment; or
an annotation file corresponding to at least a portion of said electronic map;
or any combination thereof.

24. The mobile device as recited in claim 21, wherein said candidate position fix mode corresponds to one or more positioning nodes identifiable within an electronic map corresponding to said environment.

25. The mobile device as recited in claim 21, wherein said assistance data indicates said candidate position fix mode via an identifier assigned to one of said plurality of wireless signal-based positioning modes.

26. The mobile device as recited in claim 21, wherein said one or more indicators are further indicative of at least one wireless signal observation gathered by said mobile device.

27. The mobile device as recited in claim 21, wherein said one or more indicators are further indicative of a mobile device capability related identifier corresponding to said mobile device.

28. The mobile device as recited in claim 21, wherein said candidate position fix mode is indicative of said partial region.

29. The mobile device as recited in claim 28, wherein said candidate position fix mode is indicative of a geo-fence boundary corresponding to at least a portion of said partial region.

30. The mobile device as recited in claim 28, wherein said candidate position fix mode is indicative of said partial region with regard to an electronic map corresponding to at least a portion of said environment.

31. The mobile device as recited in claim 28, wherein said candidate position fix mode is indicative of said partial region with regard to: a structure feature related identifier, a node related identifier, an environment related identifier or a location context identifier (LCI), or any combination thereof.

32. The mobile device as recited in claim 28, wherein said candidate position fix mode is indicative of said partial region with regard to: a first service related identifier corresponding to said terrestrial-based transmitting device, a second service related identifier corresponding to said satellite-based transmitting device or a mobile device capability related identifier corresponding to said mobile device, or any combination thereof.

33. The mobile device as recited in claim 21, wherein said candidate position fix mode is indicative of a conditional attribute corresponding to: said candidate position fix mode, said partial region, said terrestrial-based transmitting device, said satellite-based transmitting device or said mobile device, or any combination thereof.

34. The mobile device as recited in claim 21, wherein said partial region has been identified based, at least in part, on at least one of historical navigation observations, and/or wireless signal observations corresponding to a plurality of mobile devices with regard to said environment.

35. The mobile device as recited in claim 21, wherein said processing unit is further configured to:
gather historical navigation observations or wireless signal observations, or any combination thereof; and
initiate transmission of said historical navigation observations or said wireless signal observations, or any combination thereof, to at least one other electronic device via said communications transceiver.

36. The mobile device as recited in claim 21, wherein said assistance data is indicative of: an initial estimated position fix of said mobile device or an initial estimated course of said mobile device, or any combination thereof.

37. The mobile device as recited in claim 21, wherein said assistance data is indicative of said determination that said mobile device is estimated to be located within said threshold proximity of said partial region.

38. The mobile device as recited in claim 21, wherein at least a portion of said environment comprises a blended environment, and said blended environment comprises said partial region.

39. The mobile device as recited in claim 21, wherein said terrestrial-based transmitting device comprises an access point device of a wireless communication network; and/or said satellite-based transmitting device is part of a space positioning system (SPS).

40. The mobile device of claim 21, wherein, said plurality of wireless signal-based positioning modes comprises:
a first wireless signal-based positioning mode based on first wireless signals transmitted by a terrestrial-based transmitting device,
a second wireless signal-based positioning mode based on a second wireless signals transmitted by a satellite-based transmitting device, and
a third wireless signal-based positioning mode based on a combination of said first wireless signals and said second wireless signals.

41. An apparatus for use in a mobile device, the apparatus comprising:
means for transmitting a request, said request comprising one or more indicators indicative of an initial estimated location of said mobile device or an initial estimated course of said mobile device, or any combination thereof;
means for accessing assistance data transmitted from at least one other electronic device in response to said request, said assistance data being indicative of a candidate position fix mode for a partial region of an environment navigable by said mobile device;
means for affecting a wireless signal-based positioning function, based, at least in part, on said candidate position fix mode, in response to a determination that said mobile device is estimated to be located within a threshold proximity of said partial region; and
means for transmitting a report to at least one other electronic device subsequent to said wireless signal-based positioning function being affected based, at least in part, on said candidate position fix mode, wherein said report is indicative as to whether, as affected, said wireless signal-based positioning function successfully determines at: a current estimated position fix of said mobile device or a current estimated course of said mobile device, or any combination thereof.

42. The apparatus as recited in claim 41, wherein said assistance data is further indicative of at least one other candidate position fix mode for at least one other partial region of said environment navigable by said mobile device.

43. The apparatus as recited in claim 41, wherein said assistance data comprises:
an electronic map corresponding to at least a portion of said environment; or
an annotation file corresponding to at least a portion of said electronic map;
or any combination thereof.

44. The apparatus as recited in claim 41, wherein said candidate position fix mode corresponds to one or more positioning nodes identifiable within an electronic map corresponding to said environment.

45. The apparatus as recited in claim 41, wherein said assistance data indicates said candidate position fix mode via an identifier assigned to one of said plurality of wireless signal-based positioning modes.

46. The apparatus as recited in claim 41, wherein said one or more indicators are further indicative of at least one wireless signal observation gathered by said mobile device.

47. The apparatus as recited in claim 41, wherein said one or more indicators are further indicative of a mobile device capability related identifier corresponding to said mobile device.

48. The apparatus as recited in claim 41, wherein said candidate position fix mode is indicative of said partial region.

49. The apparatus as recited in claim 48, wherein said candidate position fix mode is indicative of a geo-fence boundary corresponding to at least a portion of said partial region.

50. The apparatus as recited in claim 48, wherein said candidate position fix mode is indicative of said partial region with regard to an electronic map corresponding to at least a portion of said environment.

51. The apparatus as recited in claim 48, wherein said candidate position fix mode is indicative of said partial region with regard: a structure feature related identifier, a node related identifier, an environment related identifier or a location context identifier (LCI), or any combination thereof.

52. The apparatus as recited in claim 48, wherein said candidate position fix mode is indicative of said partial region with regard to: a first service related identifier corresponding to said terrestrial-based transmitting device, a second service related identifier corresponding to said satellite-based transmitting device or a mobile device capability related identifier corresponding to said mobile device, or any combination thereof.

53. The apparatus as recited in claim 41, wherein said candidate position fix mode is indicative of a conditional attribute corresponding to: said candidate position fix mode, said partial region, said terrestrial-based transmitting device, said satellite-based transmitting device or said mobile device, or any combination thereof.

54. The apparatus as recited in claim 41, wherein said partial region has been identified based, at least in part, on historical navigation observations or wireless signal observations corresponding to a plurality of mobile devices with regard to said environment, or any combination thereof.

55. The apparatus as recited in claim 41, and further comprising:
means for gathering historical navigation observations or wireless signal observations, or any combination thereof; and, means for transmitting said historical navigation observations or said wireless signal observations to at least one other electronic device, or any combination thereof.

56. The apparatus as recited in claim 41, wherein said assistance data is indicative of: an initial estimated position fix of said mobile device or an initial estimated course of said mobile device, or any combination thereof.

57. The apparatus as recited in claim 41, wherein said assistance data is indicative of said determination that said mobile device is estimated to be located within said threshold proximity of said partial region.

58. The apparatus as recited in claim 41, wherein at least a portion of said environment comprises a blended environment, and said blended environment comprises said partial region.

59. The apparatus as recited in claim 41, wherein said terrestrial-based transmitting device comprises an access point device of a wireless communication network; and/or said satellite-based transmitting device is part of a space positioning system (SPS).

60. The apparatus of claim 41, wherein, said plurality of wireless signal-based positioning modes comprises:
a first wireless signal-based positioning mode based on first wireless signals transmitted by a terrestrial-based transmitting device,
a second wireless signal-based positioning mode based on a second wireless signals transmitted by a satellite-based transmitting device, and
a third wireless signal-based positioning mode based on a combination of said first wireless signals and said second wireless signals.

61. An article comprising:
a non-transitory computer readable medium having computer implementable instructions executable by a processing unit of a mobile device to:
initiate transmission of a request, said request comprising one or more indicators indicative of an initial estimated location of said mobile device or an initial estimated course of said mobile device, or any combination thereof;
obtain assistance data from at least one other electronic device transmitted in response to said request, said assistance data being indicative of a candidate position fix mode for a partial region of an environment navigable by said mobile device, said candidate position fix mode being selected by the at least one other electronic device from a plurality of wireless signal-based positioning modes based, at least in part, on the one or more indicators;
in response to a determination that said mobile device is estimated to be located within a threshold proximity of said partial region, affect a wireless signal-based positioning function based, at least in part, on said candidate position fix mode; and
initiate transmission of a report to at least one other electronic device subsequent to said wireless signal-based positioning function being affected based, at least in part, on said candidate position fix mode, wherein said re ort is indicative as to whether, as affected, said wireless signal-based positioning function successfully determines at: a current estimated position fix of said mobile device or a current estimated course of said mobile device, or any combination thereof.

62. The article as recited in claim 61, wherein said assistance data is further indicative of at least one other candidate position fix mode for at least one other partial region of said environment navigable by said mobile device.

63. The article as recited in claim 61, wherein said assistance data comprises:
an electronic map corresponding to at least a portion of said environment; or
an annotation the corresponding to at least a portion of said electronic map;
or any combination thereof.

64. The article as recited in claim 61, wherein said candidate position fix mode corresponds to one or more positioning nodes identifiable within an electronic map corresponding to said environment.

65. The article as recited in claim 61, wherein said assistance data indicates said candidate position fix mode via an identifier assigned to one of said plurality of wireless signal-based positioning modes.

66. The article as recited in claim 61, wherein said request is indicative of at least one wireless signal observation gathered by said mobile device.

67. The article as recited in claim 61, wherein said request is indicative of a mobile device capability related identifier corresponding to said mobile device.

68. The article as recited in claim 61, wherein said candidate position fix mode is indicative of said partial region.

69. The article as recited in claim 68, wherein said candidate position fix mode is indicative of a geo-fence boundary corresponding to at least a portion of said partial region.

70. The article as recited in claim 68, wherein said candidate position fix mode is indicative of said partial region with regard to an electronic map corresponding to at least a portion of said environment.

71. The article as recited in claim 68, wherein said candidate position fix mode is indicative of said partial region with regard to: a structure feature related identifier, a node related identifier, an environment related identifier or a location context identifier (LCI), or any combination thereof.

72. The article as recited in claim 68, wherein said candidate position fix mode is indicative of said partial region with regard to: a first service related identifier corresponding to said terrestrial-based transmitting device, a second service related identifier corresponding to said satellite-based transmitting device or a mobile device capability related identifier corresponding to said mobile device, or any combination thereof.

73. The article as recited in claim 61, wherein said candidate position fix mode is indicative of a conditional attribute corresponding to: said candidate position fix mode, said partial region, said terrestrial-based transmitting device, said satellite-based transmitting device or said mobile device, or any combination thereof.

74. The article as recited in claim 61, wherein said partial region has been identified based, at least in part, on historical navigation observations or wireless signal observations corresponding to a plurality of mobile devices with regard to said environment, or any combination thereof.

75. The article as recited in claim 61, further comprising computer implementable instructions to:
gather historical navigation observations or wireless signal observations, or any combination thereof; and,
initiate transmission of said historical navigation observations or said wireless signal observations to at least one other electronic device, or any combination thereof.

76. The article as recited in claim 61, wherein said assistance data is indicative of: an initial estimated position fix of said mobile device or an initial estimated course of said mobile device, or any combination thereof.

77. The article as recited in claim 61, wherein said assistance data is indicative of said determination that said mobile device is estimated to be located within said threshold proximity of said partial region.

78. The article as recited in claim 61, wherein at least a portion of said environment comprises a blended environment, and said blended environment comprises said partial region.

79. The article as recited in claim 61, wherein said terrestrial-based transmitting device comprises an access point device of a wireless communication network; and/or said satellite-based transmitting device is part of a space positioning system (SPS).

80. The article of claim 61, wherein, said plurality of wireless signal-based positioning modes comprises:
- a first wireless signal-based positioning mode based on first wireless signals transmitted by a terrestrial-based transmitting device,
- a second wireless signal-based positioning mode based on a second wireless signals transmitted by a satellite-based transmitting device, and
- a third wireless signal-based positioning mode based on a combination of said first wireless signals and said second wireless signals.

* * * * *